United States Patent
Suzuki

(10) Patent No.: US 6,497,635 B2
(45) Date of Patent: Dec. 24, 2002

(54) VEHICLE TRANSMISSION CONTROL APPARATUS

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 13 days.

(21) Appl. No.: 09/791,581

(22) Filed: Feb. 26, 2001

(65) Prior Publication Data

US 2001/0023666 A1 Sep. 27, 2001

(30) Foreign Application Priority Data

Mar. 23, 2000 (JP) ........................................ 2000-082762

(51) Int. Cl.[7] ................................................ B60K 1/02
(52) U.S. Cl. ............................ 477/3; 477/20; 180/65.2; 180/65.3
(58) Field of Search ........................... 477/3, 4, 15, 20, 477/29; 180/65.2, 65.3

(56) References Cited

U.S. PATENT DOCUMENTS

| | | | |
|---|---|---|---|
| 4,336,778 A | * 6/1982 | Howard | 123/198 D |
| 5,337,848 A | 8/1994 | Bader | 180/65.2 |
| 5,679,099 A | * 10/1997 | Kato et al. | 192/54.3 |
| 5,720,690 A | 2/1998 | Hara et al. | 477/20 |
| 5,993,350 A | 11/1999 | Lawrie et al. | 477/5 |
| 6,007,443 A | * 12/1999 | Onimaru et al. | 180/65.2 |
| 6,018,694 A | * 1/2000 | Egami et al. | 180/65.2 |
| 6,278,915 B1 | * 8/2001 | Deguchi et al. | 180/65.2 |
| 6,352,489 B1 | * 3/2002 | Kuroda et al. | 180/65.2 |

FOREIGN PATENT DOCUMENTS

| | | |
|---|---|---|
| JP | A-8-251708 | 9/1996 |
| JP | A-9-310755 | 12/1997 |
| JP | A-11-125328 | 5/1999 |

* cited by examiner

Primary Examiner—Sherry Estremsky
Assistant Examiner—Tisha D. Lewis
(74) Attorney, Agent, or Firm—Oliff & Berridge, PLC

(57) ABSTRACT

A transmission control apparatus is used with a vehicle having an internal combustion engine, a transmission connected to the engine and having a plurality of gear positions, and a generator which is disposed between the transmission and drive wheels and which is capable of generating electric power through regenerative braking during deceleration of the vehicle. The control apparatus operates to detect a revolution speed of the internal combustion engine, and to place the transmission in a highest gear position selected from one or more gear positions that enable the engine revolution speed to be maintained at a level not lower than a predetermined lower limit above which the engine can operate by itself (i.e., re-start), when the generator generates electric power through regenerative braking.

12 Claims, 4 Drawing Sheets

VEHICLE TRANSMISSION CONTROL APPARATUS

INCORPORATION BY REFERENCE

The disclosure of Japanese Patent Application No. 2000-082762 filed on Mar. 23, 2000 including the specification, drawings and abstract is incorporated herein by reference in its entirety.

BACKGROUND OF THE INVENTION

1. Field of the Invention

The invention relates in general to an apparatus for controlling a transmission of a vehicle such as, for example, an automotive vehicle, and more particularly to an apparatus for controlling a transmission having a plurality of gear ratios provided in a vehicle that also includes an internal combustion engine and an electric generator which is disposed downstream of the transmission and which is capable of effecting regenerative braking so as to convert the energy of the braking into electric energy (that can be stored in a battery). The apparatus may assure smooth running of the internal combustion engine as well as efficient conversion of the regenerative braking energy into the electric energy.

2. Description of Related Art

A motor vehicle of the type powered by an internal combustion engine (gasoline engine or diesel engine) is usually equipped with a battery for power supply to energize various electronic components. This battery is charged by an electric generator (alternator) provided on the vehicle. In recent years, development and marketing of a hybrid vehicle (HV) equipped with a hybrid power train system have been in progress, in an effort to protect the environment and to improve the fuel economy of the vehicle. The hybrid power train system employs a combination of two different types of drive power sources such as a combination of an internal combustion engine and an electric motor (commonly referred to as "motor/generator" and abbreviated as "MG"). In the hybrid power train system, the internal combustion engine and the electric motor are selectively used depending upon a specific running condition of the vehicle. The hybrid power train system permits highly smooth and highly responsive control of the vehicle drive power, while making a good use of different characteristics of the internal combustion engine and the electric motor, with their disadvantageous aspects being compensated for by each other. Such a hybrid vehicle is also equipped with a battery for operating the MG as an electric motor. This battery is charged with an electric energy generated by the MG operated as an electric generator. More specifically, the electric generator is driven by a drive force produced by the internal combustion engine, or by a kinetic energy of the vehicle under deceleration, which kinetic energy is utilized by the electric generator for regenerative braking.

The regenerative braking with the electric generator (MG) takes place during deceleration of the vehicle, so as to convert the kinetic energy of the vehicle into an electric energy to be stored in the battery. The energy conversion efficiency is maximum if the entire amount of the kinetic energy of the vehicle can be converted into the electric energy. In this respect, the drive shaft connected to the drive wheels of the vehicle and the MG (electric generator) are connected to the engine through at least a transmission. Accordingly, the kinetic energy of the vehicle during deceleration is partly consumed by an action of the engine so-called "motoring", which creates a drag on the power train. The motoring of the engine results in an energy loss due to friction (engine friction being proportional to the square of the engine speed), so that the amount of the kinetic energy available for consumption by the electric generator is made smaller than the entire amount of the kinetic energy, and the amount of electric power that can be generated by the electric generator is accordingly reduced.

In order to increase the amount of electric power that can be generated during regenerative braking with the electric generator, there is known a method in which a clutch disposed between the drive shaft and the engine is released upon regenerative braking, so as to prevent the motoring of the engine, thereby avoiding an otherwise possible loss of the kinetic energy. With this method, the amount of the kinetic energy of the drive shaft that can be used by the electric generator may be increased to improve the regenerative braking efficiency. There is known another method in which the transmission having a plurality of gear positions (speed positions) that provide respective different gear ratios or speed ratios is automatically shifted up to the highest-gear position or highest-speed position (e.g., fifth-gear or sixth-gear position) upon regenerative braking, to lower the revolution speed of the engine connected to the transmission through the drive shaft, for reducing the engine friction and the resulting energy loss, to improve the regenerative braking efficiency. It is noted that the highest-gear position is defined as the position having the highest ratio of the output speed of the transmission to the input speed of the transmission. JP-A-8-251708 discloses a technique relating to the latter method. According to this technique, the shifting action of the transmission is controlled to select the appropriate gear ratio that enables the electric generator to operate in an optimum condition with the highest efficiency.

However, the method of releasing the clutch to disconnect the engine from the electric generator suffers from a speed reduction of the engine down to its idling speed or stalling of the engine. Therefore, this method requires a rise of the engine speed and an engaging action of the clutch, upon subsequent transition of the vehicle running state from the decelerating state into an accelerating state. These requirements cause a delay of the vehicle accelerating action with respect to an operation of the accelerator pedal (i.e., a poor response of the power train to an increase in the operating amount of the accelerator pedal), and prevent smooth acceleration of the vehicle, unexpectedly to the vehicle driver. On the other hand, the method of shifting the transmission up to the selected high-gear position or high-speed position may cause the engine speed (rotating speed of the drive shaft multiplied by the gear ratio of the transmission) to be lowered below a certain lower limit while the vehicle running speed is lowered during the deceleration. In this event, it is difficult to re-start (re-fire) the engine because its speed is lower than the lower limit. Further, the deceleration (or stopping) of the vehicle with the transmission placed in its highest-gear position when the vehicle is required to be shifted down toward the lowest-gear position requires the transmission to be accelerated again (to be re-started or launched). Thus, this method also suffers from a delay of the vehicle acceleration with respect to the accelerator pedal operation (i.e., a poor response of the power train to the accelerator pedal operation), preventing smooth acceleration of the vehicle, unexpectedly to the vehicle driver.

SUMMARY OF THE INVENTION

It is therefore an object of the invention to provide an apparatus for controlling a transmission provided in an automotive vehicle that includes an electric generator which is disposed downstream of the transmission and which is capable of effecting regenerative braking during a decelerating phase of the vehicle, which apparatus is arranged to assure smooth transition of the vehicle running state from the decelerating phase to an accelerating phase by re-starting of an internal combustion engine, as well as efficient conversion of the regenerative braking energy into electric energy.

The above and/or other objects may be achieved according to one aspect of the invention, which provides a transmission control apparatus of a vehicle that includes an internal combustion engine, a transmission connected to the internal combustion engine and having a plurality of gear positions with respective gear ratios, and a generator disposed between the transmission and drive wheels, which generator is capable of generating electric power through regenerative braking during deceleration of the vehicle. The apparatus includes a detector that detects a revolution speed of the internal combustion engine, and a shift controller that places the transmission in a highest gear position selected from one or more gear positions that enable the engine revolution speed to be maintained at a level that is not lower than a predetermined lower limit above which the engine can operate by itself (i.e., be re-started), when the generator generates electric power through regenerative braking.

According to the apparatus of this aspect of the invention, the transmission is automatically shifted, upon deceleration of the vehicle, to a highest gear position selected from one or more gear positions which enables the internal combustion engine to maintain its speed at a level not lower than a predetermined lower limit above which the engine can operate by itself. This arrangement not only enables the internal combustion engine to run at a speed not lower than the predetermined lower limit, but also permits the revolution speed of the internal combustion engine to be kept close to the predetermined lower limit, due to the automatic up-shift action of the transmission. Thus, the instant arrangement makes it possible to reduce the friction of the internal combustion engine and minimize the energy loss during the regenerative braking, resulting in an increase in the regenerative braking efficiency. Further, since the revolution speed of the internal combustion engine is kept high enough to enable the engine to be re-started, the transition of the running state of the vehicle from the decelerating phase to the accelerating phase (starting phase) can be smoothly effected with a high degree of response, as desired by the vehicle driver, without the conventionally required operations to control the power train, such as an engaging action of the clutch, an increase of the engine speed, and a down-shift action of the transmission.

In one preferred aspect of the invention, the shift controller determines whether the revolution speed of the engine is higher than the predetermined lower limit, and shifts down the transmission by one gear position when the revolution speed of the engine is not higher than the predetermined lower limit.

In another preferred aspect of the invention, the vehicle further includes a clutch disposed between the transmission and the engine, and the shift controller operates to release the clutch so as to disconnect the internal combustion engine and the transmission from each other, when the selected highest gear position is the lowest one of the plurality of gear positions of the transmission.

In the above aspect of the invention, the disconnection of the internal combustion engine from the transmission eliminates the friction of the internal combustion engine, and reduces the energy loss, permitting efficient regenerative braking with a kinetic energy transferred from the vehicle drive wheels. In addition, the transmission is shifted down to its lowest gear position before the internal combustion engine is connected again to the transmission, so that the vehicle can be smoothly accelerated (or started), without the conventionally effected down-shift action of the transmission from the highest-gear position.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A preferred embodiment of this invention will be described with reference to the accompanying drawings.

Figure 1:
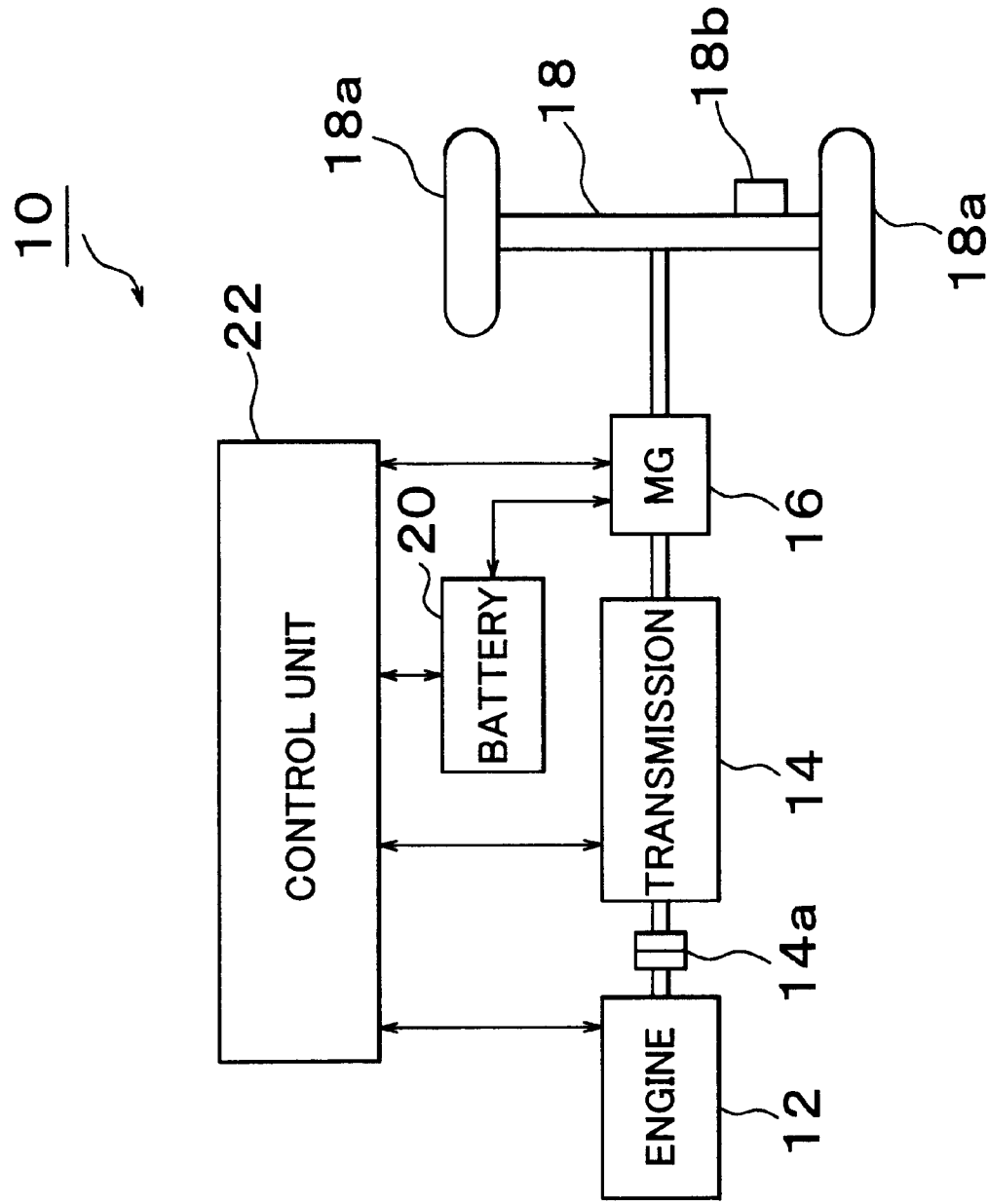
FIG. 1 is a block diagram of a hybrid vehicle (HV) including a transmission control apparatus according to one embodiment of this invention.

Reference is first made to the schematic view of FIG. 1, which shows an arrangement of a hybrid power train vehicle (HV) 10, which is one form of a vehicle of the type in which an electric generator is disposed downstream of a transmission having a plurality of gear positions that provide respective different gear ratios.

The hybrid power train vehicle 10 (hereinafter referred to as "hybrid vehicle 10" or simply as "vehicle 10") includes an internal combustion engine 12 (hereinafter referred to simply as "engine 12"), which may be a gasoline engine or a diesel engine. To the engine 12, there is connected through a clutch (automatic clutch) 14a, a transmission 14 having a plurality of gear positions or speed positions providing respective different gear ratios (speed ratios). The transmission 14 can be disconnected from the engine 12 by releasing the clutch 14a. To the output side of the transmission 14 is connected a motor/generator (MG) 16, which in turn is connected to a battery 20. The battery 20 is provided to store electric energy generated by the MG 16 when the MG 16 is operated as an electric generator, and to supply the MG 16 with an electric energy when the MG 16 is operated as an electric motor. The engine 12, transmission 14, MG 16 and battery 20 are connected to a control unit 22, which functions to monitor the operating states of those devices and control them in relation to each other.

When the hybrid vehicle 10 is normally driven, the control unit 22 determines a required output of the engine 12, on the basis of the operating amount of the accelerator pedal and the running speed of the vehicle, such that the determined output of the engine 12 enables the vehicle to be run in a running state as desired by the driver or operator of the vehicle. The control unit 22 further selects one of the gear-positions of the transmission 14, and determines the revolution speed of the engine 12 and the amount of fuel to be injected into the engine 12. The hybrid vehicle 10 has a plurality of running or driving modes, and the control unit 22 has a plurality of control modes corresponding to the driving modes of the vehicle 10. The driving modes include: an ENGINE DRIVE mode in which the vehicle 10 is driven with only a drive force produced by the engine 12 and transmitted through the transmission 14 to drive wheels 18a; an ENGINE & MOTOR DRIVE mode which is selected when the driver's desired vehicle drive force is larger than the drive force produced by the engine 12, and in which the vehicle 10 is driven with not only the drive force produced by the engine 12, but also a drive force produced by the MG 16 operated as the electric motor with the electric energy supplied from the battery 20, so that the vehicle 10 is driven with a sum of the drive force of the engine 12 and the backup drive force of the electric generator 16; and a MOTOR DRIVE mode in which the vehicle 10 is driven with only the drive force produced by the MG 16 operated as the electric motor with the electric energy supplied from the battery 20.

When the amount of electric energy (SOC: state of charge) presently stored in the battery 20 is smaller than a predetermined lower limit, the battery 20 is charged by the MG 16 operated as the electric generator with either a drive force received from the engine 12 or a kinetic energy of the running (moving) vehicle 10. In the former case, the control unit 22 increases the output of the engine 12 and operates the MG 16 as the electric generator, so that a drive force required to drive the vehicle 10 is transmitted from the engine 12 to the drive wheels 18a through a drive shaft 18, while the rest of the output of the engine 12 is used to operate the MG 16 as the electric generator for charging the battery 20. The battery 20 is charged until the electric energy amount SOC stored in the battery 20 is increased to a predetermined amount. In the latter case, the kinetic energy of the vehicle 10 under deceleration is transmitted to the MG 16 so that regenerative braking is effected so as to convert the kinetic energy into an electric energy used to charge the battery 20. In this respect, it is noted that when the electric energy amount SOC in the battery 20 is larger than a predetermined upper limit, the control unit 22 reduces the drive force of the engine 12 to a value smaller than the required vehicle drive force, and operates the MG 16 as the electric motor to produce a drive force, so that a sum of the drive force of the engine 12 and the drive force of the MG 16 is transmitted to the drive wheels 18a through the transmission 14 and the drive shaft 18. In this case, the amount of fuel consumption by the engine 12 is reduced, resulting in improved fuel economy, and the electric energy amount SOC of the excessively charged battery 20 is reduced down to a suitable value, to increase the amount of electric energy that can be stored in the battery 20 when the regenerative braking is subsequently effected by the MG 16. Thus, the control unit 22 controls the engine 12 and the MG 16, for efficient utilization of the electric energy stored in the battery 20, for driving the hybrid vehicle 10.

Figure 2:
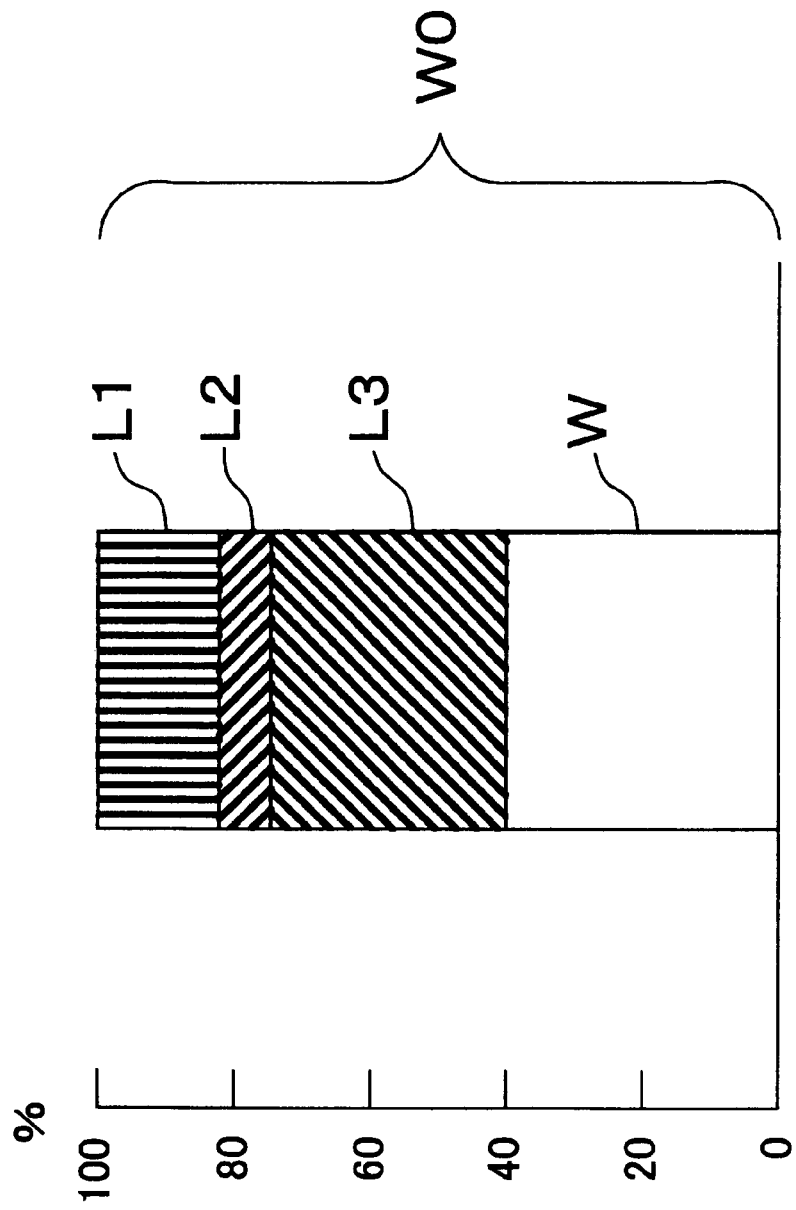
FIG. 2 is a view useful for explaining an amount of energy that can be used for regenerative braking during deceleration of the vehicle, in relation to wasted or dissipated amounts of energy.

In the graph of FIG. 2, "W0" represents the entire amount of kinetic energy of the hybrid vehicle 10 under deceleration, minus the amount of loss of the kinetic energy due to an aerodynamic drag and a rolling resistance. Actually, however, a portion of the amount of energy W0 is dissipated or wasted by an amount corresponding to a sum of (1) an energy loss L1 due to heat generation by wheel brakes operated for deceleration of the vehicle 10, (2) an energy loss L2 of the MG 16 (electric generator) per se, and (3) an energy loss L3 due to "motoring" of the engine 12. The engine 12 is "motored" because a rotary motion of the drive shaft 18 connected to the MG 16 is transmitted to not only the MG 16 but also to the engine 12, which is connected to the drive shaft 18 through the transmission 14, as shown in FIG. 1. The graph of FIG. 2 indicates an example of the percent values of the individual energy losses L1, L2, L3, with respect to the energy amount W0 (100%). Thus, the amount of kinetic energy that can be actually converted by the MG 16 into an electric energy during deceleration of the vehicle 10 is equal to "W", which is equal to W0−(L1+L2+L3). This amount of kinetic energy will be referred to as "regenerative braking energy".

When the clutch 14a is released during regenerative braking with the MG 16, the energy loss L3 due to the motoring of the engine 12 is avoided, so that the amount of regenerative braking energy W can be increased. On the other hand, however, the releasing of the clutch 14a causes the revolution speed of the engine 12 to be lowered down to the idling speed, or stalling of the engine 12, as described above. In this case, therefore, it is required to raise the speed of the engine 12 to a predetermined level and then engage the clutch 14a upon the start of subsequent acceleration of the vehicle 10. Thus, the releasing action of the clutch 14a does not permit smooth acceleration of the vehicle 10 as desired by the vehicle driver.

The revolution speed ("motoring speed") of the engine 12 can be lowered by shifting up the transmission 14 to its highest-gear position, rather than by releasing the clutch 14a, so that the energy loss L3 due to the friction of the engine 12 is reduced, that is, the regenerative braking energy W is increased. During reduction of the running speed of the vehicle 10 under deceleration, however, the speed of the engine 12 (speed of the drive shaft 18×gear ratio of the highest-gear position) may be lowered below a lower limit below which the engine 12 cannot be started. In this case, it would be difficult to re-start or re-fire the engine 12. The up-shift action of the transmission 14 to the highest-gear position during deceleration of the vehicle 10 has a further drawback that the transmission 14 which remains in the highest-gear position at the end of the deceleration of the vehicle 10 (or even after the stopping of the vehicle 10) is required to be shifted down when the vehicle 10 is required to be re-accelerated or re-started. This means a delayed acceleration of the vehicle 10 in response to the acceleration pedal operation (i.e., a poor response of the power train to an increase in the operating amount of the accelerator pedal), preventing smooth acceleration of the vehicle, unexpectedly to the vehicle driver.

In view of the above drawbacks, the transmission control apparatus is arranged according to the principle of this invention, so as to improve the regenerative braking efficiency by lowering the revolution speed (motoring speed) of the engine 12 as much as possible to thereby minimize the amount of energy loss at the engine 12, while at the same time enabling the engine 12 to be smoothly accelerated (re-started) without a releasing action of the clutch 14a for disconnection of the engine 12 from the MG 16.

To achieve the objective indicated above, the embodiment is adapted to automatically shift up the transmission 14, upon deceleration of the vehicle 10, to a highest-gear position selected from at least one gear-position thereof which enables the engine 12 to maintain its speed at a level not lower than (i.e., at or above) a predetermined lower limit above which the engine 12 can operate by itself (i.e., above which the engine can re-start). This arrangement to shift the transmission 14 to the selected gear-position the gear ratio of which is as high as possible not only enables the engine 12 to run at a speed equal to or higher than the predetermined lower limit (e.g., 1000 r.p.m.), but also permits the speed of the engine 12 to be kept close to the lower limit (e.g., 1000 r.p.m.), owing to the automatic up-shift action of the transmission 14. Thus, the instant arrangement makes it possible to lower the speed of the engine 12, and reduce the friction of the engine 12, which is proportional to a square of the speed of the engine 12. In other words, the present arrangement makes it possible to reduce the friction of the engine 12 due to its "motoring" and minimize the energy loss during the regenerative braking, resulting in an increase in the regenerative braking efficiency. Additionally, when the engine 12 is required to be re-started (re-accelerated), the revolution speed of the engine 12 is high enough to enable the engine 12 to operate by itself, so that the engine 12 can be smoothly re-started or re-accelerated.

Referring to the flowchart of FIG. 3, the control routine executed by the control unit 22 (FIG. 1) to control the transmission 14 will be described.

The control routine is initiated with step S100 to determine whether deceleration of the vehicle 10 is initiated, namely, whether the MG 16 can be operated as an electric generator for regenerative braking, using a kinetic energy of the vehicle 10 under deceleration. This determination in step S100 is made on the basis of an output signal of a speed sensor 18b provided to detect the rotating speed of the drive shaft 18. If an affirmative decision (YES) is obtained in step S100, the control flow goes to step S101 in which the control unit 22 commands the transmission 14 to be shifted up to its highest-gear position (for instance, fifth-gear position). Of all the gear-positions of the transmission 14, the highest-gear position has the highest ratio of the output speed to the input speed of the transmission 14. This shifting action of the transmission 14 to its highest-gear position causes a reduction in the revolution speed of the engine 12 (which is not presently required to produce an output with the accelerator pedal held at its non-operated position), resulting in a decrease of the friction of the engine 12, and a decrease of the energy loss L3 due to the "motoring" of the engine 12, so that the amount of regenerative braking energy W that can be converted by the MG 16 into an electric energy is accordingly increased.

The control flow then goes to step S102 to determine whether the current speed of the engine 12 is higher than a predetermined lower limit above which the engine 12 can be started (can operate by itself). The speed of the engine 12 is equal to a product of a rotating speed Np of the drive shaft 18 as detected by the speed sensor 18b, and the gear ratio of the currently selected gear-position of the transmission 14. However, as an alternative, the speed of the engine 12 as directly detected by an engine speed sensor may be compared with the predetermined lower limit. The lower limit used in step S102 is the highest speed above which the engine 12 can be smoothly fired and can operate by itself. If an affirmative decision (YES) is obtained in step S102, the control flow goes to step S103 to determine whether the vehicle 10 continues its deceleration with its transmission 14 kept in the same gear-position. If an affirmative decision (YES) is obtained in step S103, the control flow goes back to step S102 to repeat the determination as to whether the speed Np multiplied by the gear ratio of the currently selected gear-position of the transmission 14 is higher than the predetermined lower limit. If the deceleration of the vehicle 10 is terminated, a negative decision (NO) is obtained in step S103, and the control flow goes to step S104 in which the transmission 14 is controlled in the normal mode, that is, one of the gear-positions of the transmission 14 is selected on the basis of the vehicle drive force as desired by the vehicle driver (as expressed by the detected operating amount of the accelerator pedal), and the running condition of the vehicle as expressed by the detected running speed of the vehicle 10, the detected speed of the engine 12, etc. Then, the control flow returns to step S100 to determine whether the vehicle 10 is decelerated again.

If in step S102 the speed Np multiplied by the gear-ratio is not higher than the predetermined lower limit, it means that it would be difficult to re-start or re-fire the engine 12 due to its speed being excessively lowered during deceleration of the vehicle 10 with the transmission 14 placed in the highest-gear position. In this case, a negative decision (NO) is obtained in step S102, and the control flow goes to step S105 in which the control unit 22 commands the transmission 14 to be shifted down by one position, that is, to the next lower-gear position, for increasing the speed of the engine 12 to a level higher than the predetermined lower limit. Step S105 is followed by step S106 to determine whether the transmission 14 is placed in the first-gear position (first-speed position) having the lowest gear ratio. If a negative decision (NO) is obtained in step S106, the control flow goes to the step S103. If it is determined in step S106 that the transmission 14 is placed in the first-gear position, it means that the speed of the engine 12 cannot be further raised by further shifting down the transmission 14. In this case, the control flow goes to step S107 to release the clutch 14a, thereby disconnecting the engine 12 and the transmission 14 from each other, to thereby stop the engine 12, so that the regenerative braking with the MG 16 can be continued with high efficiency. When the clutch 14a is engaged to re-connect the engine 12 and the transmission 14, the transmission 14 is placed in (i.e., it has already been placed in) the lowest-gear position (fist-speed position), so that the vehicle 10 can be smoothly accelerated or started upon a subsequent operation of the accelerator pedal by the vehicle driver, without the conventionally required down-shift action of the transmission 14 from its highest-gear position.

Figure 3:
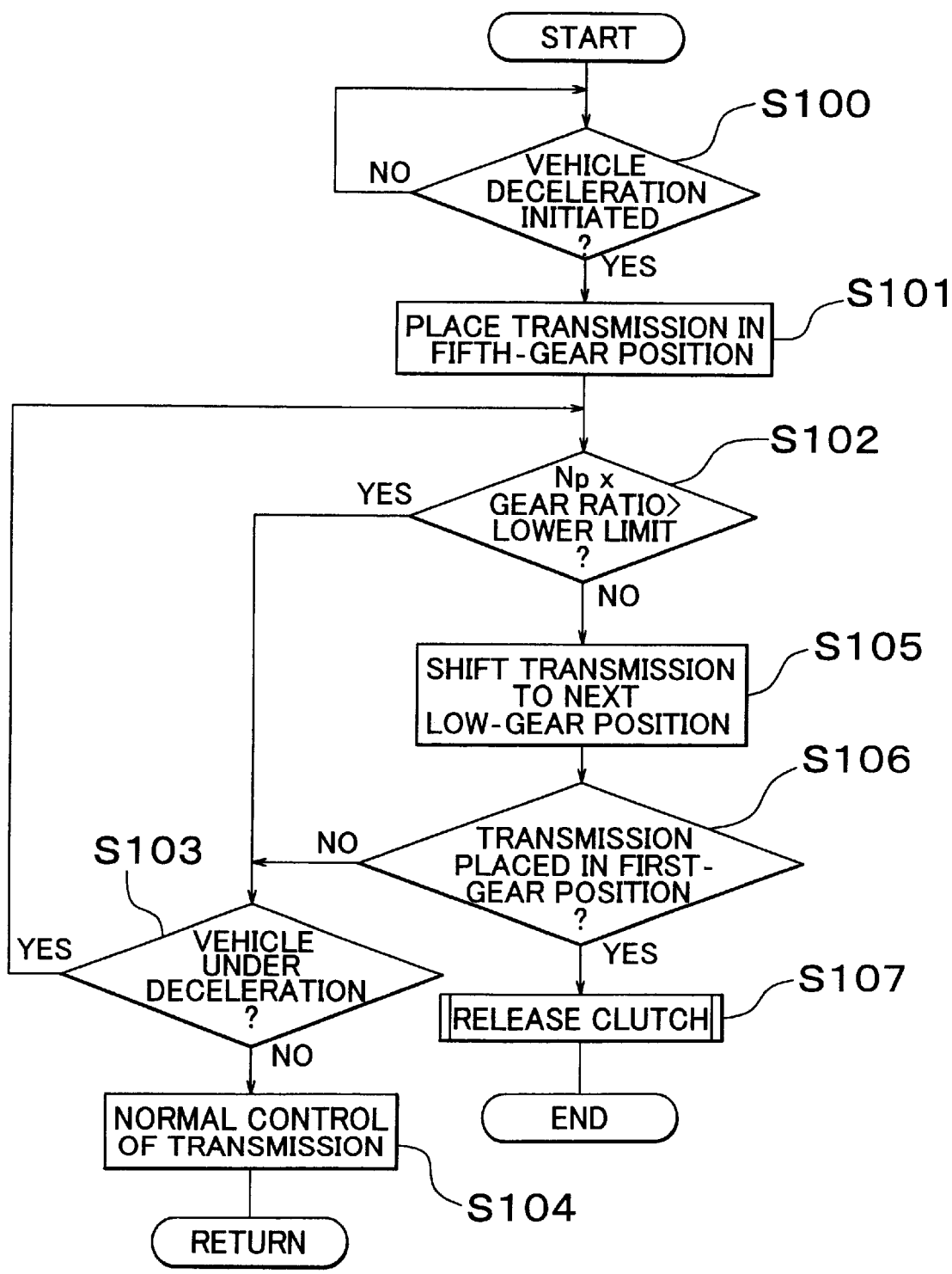
FIG. 3 is a flowchart illustrating a control routine executed by the transmission control apparatus according to the embodiment of the invention.
Figure 4:
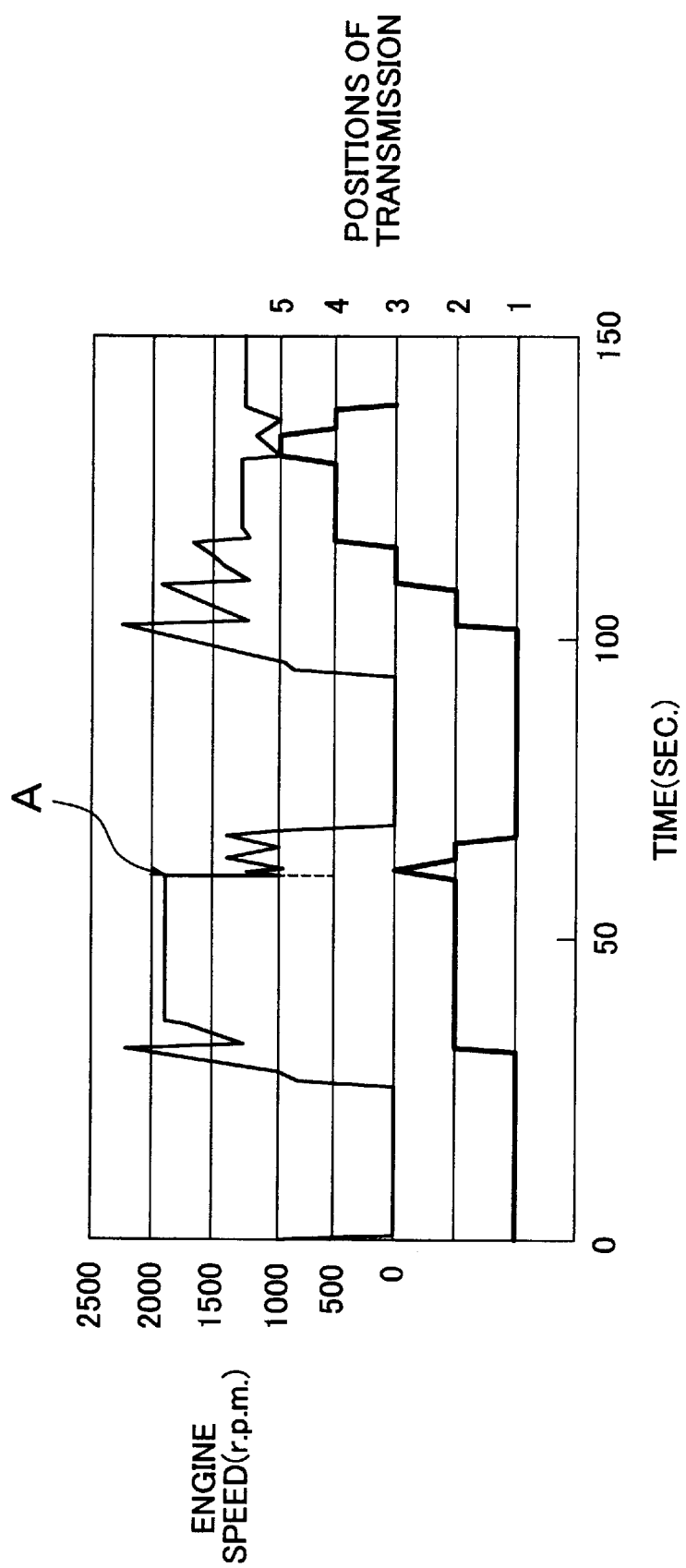
FIG. 4 is a time chart indicating changes in the speed of an engine and shifting actions of a transmission when the transmission is controlled by the transmission control apparatus.

The time chart of FIG. 4 shows changes in the speed of the engine 12 and shifting actions of the transmission 14 when the control routine illustrated in the flowchart of FIG. 3 is executed. In the time chart, "A" represents a point at which the deceleration of the vehicle 10 is initiated, and at which the transmission 14 is commanded to be shifted up to the highest-gear position, but is placed in the third-gear position since the running speed of the vehicle 10 is not so high. Described in detail, the highest-gear position to which the transmission 14 is allowed to be shifted up during deceleration of the vehicle 10 is limited by the vehicle running speed, namely, is determined on the basis of the vehicle running speed and according to a predetermined relationship between the vehicle running speed and the highest-gear position that can be selected. This relationship is represented by a data map stored in the control unit 22. When the vehicle running speed is sufficiently high, the transmission 14 is shifted up to the fifth-gear position. Subsequently, step S102 and the following steps are implemented, so that the transmission 14 is shifted down so as to maintain the engine speed at a level higher than the predetermined lower limit (for example, 1000 r.p.m.). In the specific example of FIG. 4, the transmission 14 is eventually shifted down to the first-gear position, and the vehicle 10 is brought to a stop. Namely, the transmission 14 has been placed in the first-gear position when the vehicle 10 is re-started, so that the vehicle 10 can be smoothly started with an increase of the speed of the engine 12, without a down-shift action of the transmission 14 from the higher-gear position.

As described above, when the vehicle 10 is decelerated, the transmission 14 is shifted up to a highest-gear position selected from at least one-gear position that enables the engine speed to be maintained at a level not lower than the predetermined lower limit above which the engine 12 can operate by itself, so that the speed of the engine 12 is lowered as much as possible, to reduce the friction of the engine and reduce the amount of reduction of the kinetic energy of the drive shaft 18 that can be used by the MG 16 for regenerative braking. Accordingly, the regenerative braking with the MG 16 can be effected to convert the kinetic energy into the electric energy with a high degree of efficiency. Since the speed of the engine 12 is kept at a level not lower than the above-indicated lower limit, the engine 12 can be smoothly re-started.

While one example of the control routine for controlling the transmission 14 during deceleration of the vehicle 10 has been described, the transmission 14 may be controlled otherwise, provided that the transmission is shifted, upon deceleration of the vehicle 10, to a highest-gear position selected from at least one gear-position which enables the engine 12 to maintain its speed at a level higher than the predetermined lower limit above which the engine 12 can operate by itself. Although the transmission control apparatus according to the illustrated embodiment is arranged for use with the hybrid vehicle 10, the principle of the invention is equally applicable to any vehicle having an internal combustion engine and an electric generator capable of generating power through regenerative braking.

It will be understood that the invention provides an apparatus for controlling a transmission provided in a vehicle including an electric generator which is disposed downstream of the transmission and which is capable of effecting regenerative braking during deceleration of the vehicle, which apparatus is arranged to assure smooth re-starting of an internal combustion engine, as well as efficient conversion of the regenerative braking energy into an electric energy.

In the illustrated embodiment, the controller (control unit 22) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A transmission control apparatus of a vehicle that includes an internal combustion engine, a transmission connected to the internal combustion engine and having a plurality of gear positions with respective gear ratios, and a generator disposed between the transmission and drive wheels, the generator being capable of generating electric power through regenerative braking during deceleration of the vehicle, the transmission control apparatus comprising:

a detector that detects a revolution speed of the internal combustion engine; and a shift controller that places the transmission in a highest gear position selected from one or more gear positions that enable the engine revolution speed to be maintained at a level not lower than a predetermined lower limit above which the engine can be re-started, when the generator generates electric power through regenerative braking.

2. A transmission control apparatus according to claim 1, wherein the shift controller determines whether the revolution speed of the engine is higher than the predetermined lower limit, and shifts down the transmission by one gear position when the revolution speed of the engine is not higher than the predetermined lower limit.

3. A transmission control apparatus according to claim 1, wherein the vehicle further includes a clutch disposed between the transmission and the engine, and wherein the shift controller operates to release the clutch so as to disconnect the internal combustion engine and the transmission from each other, when the selected highest gear position is the lowest one of said plurality of gear positions of the transmission.

4. A transmission control apparatus according to claim 1, wherein the vehicle further includes a clutch disposed between the transmission and the engine, and wherein the shift controller operates to release the clutch so as to disconnect the internal combustion engine and the transmission from each other, when there are no gear positions that enable the engine revolution speed to be maintained at a level not lower than the predetermined lower limit.

5. A method of controlling a transmission of a vehicle that includes an internal combustion engine, a transmission connected to the internal combustion engine and having a plurality of gear positions with respective gear ratios, and a generator disposed between the transmission and drive wheels, the generator being capable of generating electric power through regenerative braking during deceleration of the vehicle, the method comprising:

detecting a revolution speed of the internal combustion engine; and placing the transmission in a highest gear position selected from one or more gear positions that enable the engine revolution speed to be maintained at a level not lower than a predetermined lower limit above which the engine can be re-started, when the generator generates electric power through regenerative braking.

6. A method according to claim 5, wherein said step of placing the transmission in a highest gear position comprises sub-steps of determining whether the revolution speed of the engine is higher than the predetermined lower limit, and shifting down the transmission by one gear position when the revolution speed of the engine is not higher than the predetermined lower limit.

7. A method according to claim 5, wherein the vehicle further includes a clutch disposed between the transmission and the engine, and further comprising:

disconnecting the internal combustion engine and the transmission from each other by releasing the clutch when the selected highest gear position is the lowest one of said plurality of gear positions of the transmission.

8. A method according to claim 5, wherein the vehicle further includes a clutch disposed between the transmission and the engine, and further comprising:

disconnecting the internal combustion engine and the transmission from each other by releasing the clutch when there are no gear positions that enable the engine revolution speed to be maintained at a level not lower than the predetermined lower limit.

9. In a hybrid vehicle that includes an internal combustion engine, a detector that detects a revolution speed of the internal combustion engine, a transmission connected to the internal combustion engine and having a plurality of gear positions with respective gear ratios, and a generator disposed between the transmission and drive wheels, the generator being capable of generating electric power through regenerative braking during deceleration of the vehicle, a transmission control apparatus comprising:

a shift controller that: (i) determines a highest gear position, selected from one or more gear positions of the transmission, that enable the engine revolution speed to be maintained at a level not lower than a predetermined lower limit, and (ii) places the transmission in the determined highest gear position when the generator generates electric power through regenerative braking.

10. In a hybrid vehicle according to claim 9, wherein the shift controller determines whether the revolution speed of the engine is higher than the predetermined lower limit, and shifts down the transmission by one gear position when the revolution speed of the engine is not higher than the predetermined lower limit.

11. In a hybrid vehicle according to claim 9, wherein the vehicle further includes a clutch disposed between the transmission and the engine, and wherein the shift controller operates to release the clutch so as to disconnect the internal combustion engine and the transmission from each other, when the determined highest gear position is the lowest one of said plurality of gear positions of the transmission.

12. In a hybrid vehicle according to claim 9, wherein the vehicle further includes a clutch disposed between the transmission and the engine, and wherein the shift controller operates to release the clutch so as to disconnect the internal combustion engine and the transmission from each other, when there are no gear positions that enable the engine revolution speed to be maintained at a level not lower than the predetermined lower limit.

* * * * *